United States Patent Office 2,735,064
Patented Feb. 14, 1956

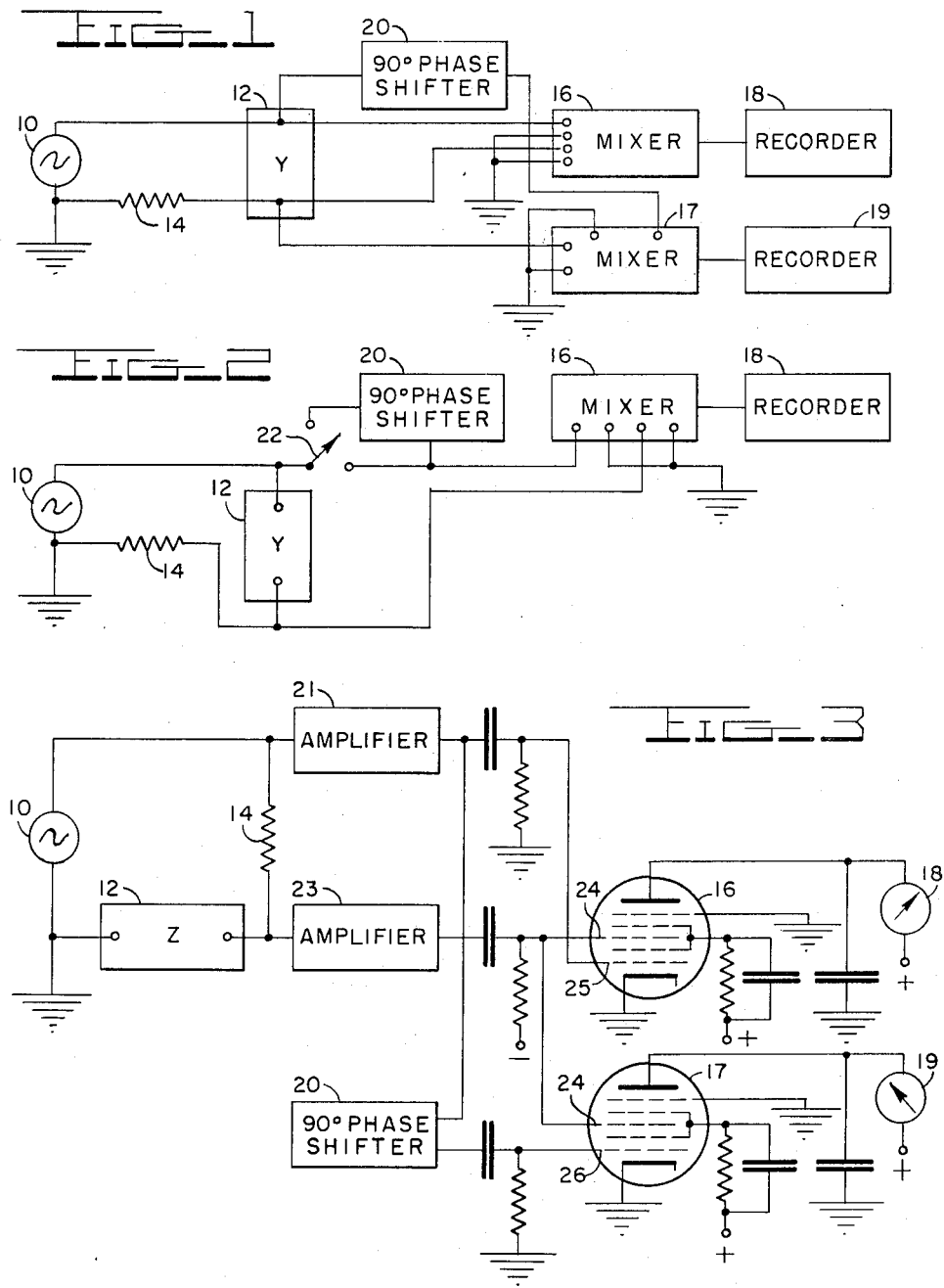

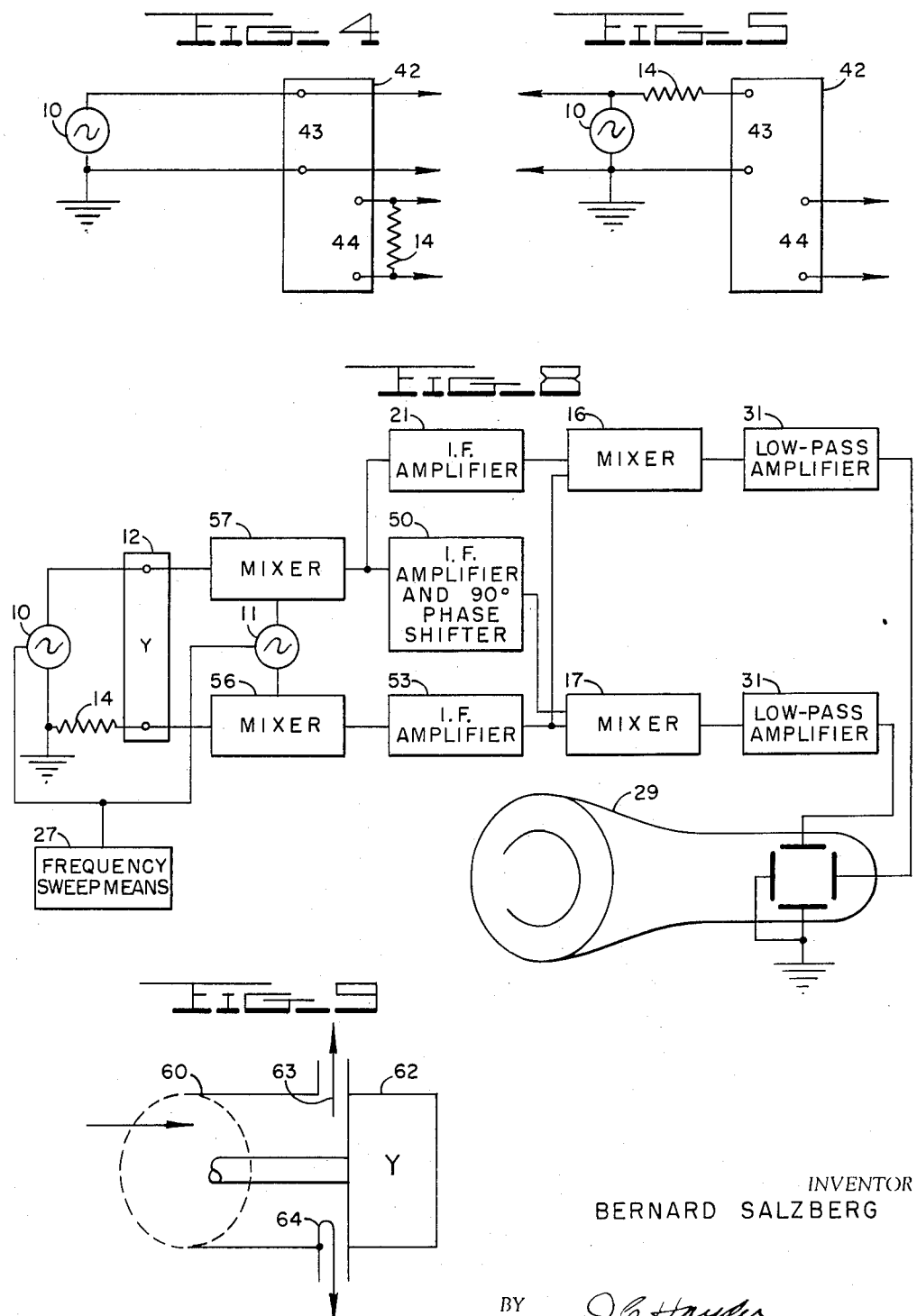

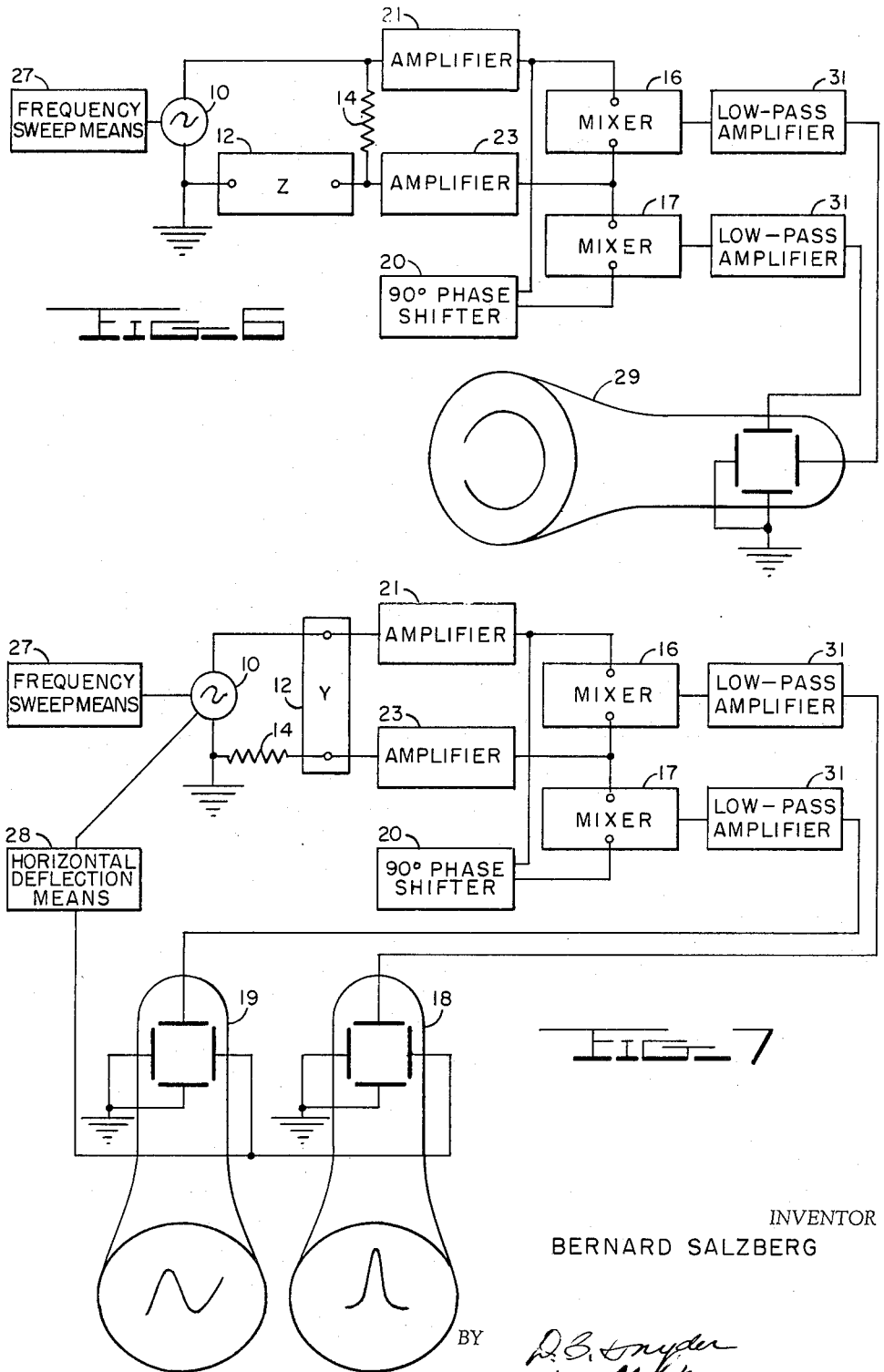

2,735,064

APPARATUS FOR RAPID MEASUREMENT OF REAL AND IMAGINARY PARTS OF ADMITTANCE OR IMPEDANCE

Bernard Salzberg, Washington, D. C.

Application August 1, 1952, Serial No. 302,280

10 Claims. (Cl. 324—57)

(Granted under Title 35, U. S. Code (1952), sec. 266)

This invention relates to an improved apparatus for the rapid and direct measurement of both the real and imaginary components of admittance and impedance.

In connection with development and design of networks, and for purposes of teaching network theory, it is very desirable to have available an apparatus for measuring rapidly and directly both the real and imaginary components of admittance and impedance. Previously, to perform such measurements, use has been made of bridges and Q-meters. These devices do not yield directly the imaginary component of admittance and impedance; instead they provide equivalent inductance or capacitance, from which the reactance or susceptance is computed. Both of these devices must be manually operated, and neither provides rapid measurements or measurements which are continuous functions of frequency. Neither of these devices can be used to determine the real and imaginary components of a transfer impedance or admittance. Furthermore, these devices are not well-adapted for pedagogical purposes, for example the classroom presentation of the electrical behavior of circuits and networks.

Accordingly, it is an object of the present invention to provide a simple apparatus capable of direct and rapid measurement of both real and imaginary components of either driving-point or transfer impedance and admittance of a network.

It is another object of the present invention to provide an apparatus capable of direct and rapid measurement, over a continuous and wide frequency range, of both real and imaginary components of either driving-point or transfer impedance and admittance.

It is a further object of this invention to provide a method for direct and rapid measurement of the components of an admittance or an impedance, and which is especially adaptable to use from very low frequencies to very high frequencies.

Another object of this invention is to provide an apparatus for measuring directly the components of an admittance or an impedance either automatically or manually, as desired.

An additional object of this invention is to provide an apparatus for rapid and direct measurement of the real and imaginary components of an admittance or an impedance, and which is well-suited for visual presentation of these measurements of electrical networks.

These and other objects of this invention will be more thoroughly understood from the following description and drawings, wherein:

Figure 1 shows a schematic diagram of an embodiment of the invention for the simultaneous measurement of the conductance and susceptance components of a driving-point admittance, Figure 2 shows a schematic diagram of an embodiment of the invention for the separate measurement of the conductance and susceptance components of a driving-point admittance, Figure 3 shows a schematic diagram of an embodiment of the invention, employing multigrid vacuum tubes as typical mixers, for the simultaneous measurement of the resistance and reactance components of a driving-point impedance, Figure 4 indicates schematically the essential connections required for measurement of the conductance and susceptance components of a transfer-admittance, typical of the method and means of the present invention, Figure 5 shows schematically the essential connections required for measurement of the resistance and reactance components of a transfer-impedance, typical of the method and means of this invention, Figure 6 shows schematically a typical arrangement of the invention adapted for use in presenting the relation between real and imaginary components of a driving-point impedance, in the form of a polar plot, over a wide and continuous range of frequencies, Figure 7 shows schematically an embodiment of the invention adapted for use in simultaneously presenting against frequency the measured values of each of the two components of a driving-point admittance, Figure 8 shows schematically an embodiment of the invention which employs a heterodyne arrangement for the purpose of carrying out fundamental operations of the measurements at an arbitrary fixed frequency, Figure 9 shows schematically the essential features of another typical embodiment utilizing the basic ideas of this invention for use at microwave frequencies.

If a voltage $V \cos pt$ is applied to two terminals of a linear network the resulting steady-state currents in the meshes of the network are of the form $I \cos (pt+\theta)$. The relation between current and voltage is expressed by the complex quantity admittance, defined as (1) $Y = G + jB = (I/V) \exp (j\theta) =$
$(I/V) \cos \theta + j(I/V) \sin \theta$ In Eq. (1) G, the real part of the admittance, is the conductance; B, the imaginary part of the admittance, is the susceptance; $j$ is the imaginary operator; and $\theta$ is the phase difference between current and voltage.

Alternatively the relation between voltage and current can be expressed by the complex quantity impedance, which is the reciprocal of the admittance.

(2) $Z = R + jX = (V/I) \exp (j\phi) =$
$(V/I) \cos \phi + j(V/I) \sin \phi$

In Eq. (2) R, the real part of the impedance, is the resistance; X, the imaginary part of the impedance, is the reactance; and $\phi$ (equal to $-\theta$) is the phase difference between voltage and current.

If the current under consideration is in the same mesh as the applied voltage, the terms admittance and impedance are further identified by the prefixes self, two-terminal, or driving-point. On the other hand, if the current under consideration is not in the same mesh as the applied voltage, the terms admittance and impedance are qualified by the prefix transfer.

It is apparent from Eqs. (1) and (2) that measurement of admittance and impedance essentially requires two operations: (a) dividing two complex numbers, and (b) resolving the resultant complex number into its real and imaginary parts. Need for the first operation can be circumvented by keeping the denominator fixed at some convenient value, for example unity. The problem of measurement then reduces to the single operation of performing the resolution of a complex number, the numerator, into its component real and imaginary parts. It has been discovered that this operation can be performed by the proper use of a mixer such as a crystal or a vacuum tube of two or more electrodes, of the kind customarily used in superheterodyne receivers.

In the ordinary use of such a mixer in superheterodyne receivers two A.-C. voltages, which are of different amplitudes and frequencies, are applied simultaneously to the input of the mixer. One of these A.-C. voltages is provided by the incoming signal. The other, which has a relatively large amplitude and a frequency which differs from the signal frequency by a fixed amount, is provided by an auxiliary source called the local oscillator. Because of the nonlinear current versus voltage characteristic of the mixer, the output current of the mixer contains a component whose frequency is equal to the difference between the frequencies of the two applied voltages. An intermediate-frequency circuit, resonant to the fixed frequency difference, is connected in series with the output terminals of the mixer. The amplitude of the voltage developed across the intermediate-frequency circuit is proportional to the amplitude of the small signal voltage. In this way the signal voltage is translated without distortion to a fixed lower frequency, at which further frequency selectivity and amplification are relatively easy to achieve. The function of the mixer in such applications is to provide a distortionless frequency translation of the signal.

In contrast, the function of the mixer in the present invention is to provide a device by means of which a complex number can be resolved into its component real and imaginary parts. The basis for such operation is the following: If an A.-C. voltage is applied to the input of a mixer the output current will consist, in general, of a D.-C. component, an A.-C. component of the same frequency as the applied voltage, and A.-C. components of higher frequencies which are harmonics of the frequency of the applied voltage. Now if another A.-C. voltage of identical frequency, but in general different phase, is also applied to the mixer the frequencies of all of these components of the mixer output current will remain unchanged but their amplitudes will be modified. No attention need be paid to the A.-C. components as they are not utilized in the present invention; in fact they are filtered out, and only the change in the D.-C. component is employed. If the amplitude of the second of the applied A.-C. voltages is relatively small, the change in the D.-C. component of the mixer output current will be found to be quite accurately proportional to the product of the magnitude of the small A.-C. voltage and the cosine of the phase difference between the two voltages. This property of a mixer can be used to determine the real part of a complex number.

Because of the trigonometric relation $\cos(\theta - 90°) = \sin \theta$, it is clear that the cosine of the phase difference between two A.-C. voltages can be converted to the sine of the phase difference between the two voltages by introducing an additional phase shift of $-90$ degrees. Accordingly, if the relative phase difference between the two A.-C. voltages which are applied to the input of the mixer is first decreased by 90 degrees, it will be found that the change in the D.-C. component of the mixer output current is quite accurately proportional to the product of the magnitude of the small A.-C. voltage and the sine of the original phase difference between the two voltages. This property of a mixer can be used to determine the imaginary part of a complex number.

The foregoing describes in a general way certain properties of mixers which can be utilized for the resolution of a complex number into its component real and imaginary parts. More specifically the essential method of the present invention for utilizing these properties of mixers in the measurement of admittance is the following: An A.-C. voltage source of constant amplitude and variable frequency is connected to the driving-point terminals of a network.

If it is desired to measure the conductance and susceptance components of the driving-point admittance, a small resistance R is connected in series with the source and the driving-point terminals. If, on the other hand, it is desired to measure the components of a transfer admittance the small resistance is connected in series with the terminals of the appropriate mesh circuit. The voltage across the driving-point terminals is $V \cos pt$. The smaller voltage drop across the series resistance, $RI \cos(pt+\theta)$, is proportional to the current, driving-point or transfer, as the case may be. The voltage across the driving-point terminals, or a sample thereof, is applied to the input of a mixer; the resultant D.-C. component of the mixer output current will have some constant value.

If the smaller voltage drop across the series resistance, or a sample thereof, is now also applied to the mixer input, the D.-C. component of the mixer output current will change, the change being equal to $kI \cos \theta$ which, it will be seen from Eq. (1), is proportional to the conductance being measured. The value of $k$, the constant of proportionality, depends on the particular mixer employed, on the D.-C. polarizing voltages—if any are used, on the value of the series resistance, and on the value of the fixed amplitude of the first A.-C. voltage. The value of $k$ can be determined very simply, and indeed the recording device which indicates the change in the mixer D.-C. output current component can be calibrated directly in mhos, the unit of conductance, merely by substituting an admittance of known conductance for the network being measured.

To determine the susceptance component of the admittance, the relative phase difference between the two A.-C. voltages is shifted by 90 degrees before they are applied to the mixer input. For example, the voltage across the driving-point terminals, or a sample thereof, is put through a 90 degree phase-shifter so that it is representable by the expression $V \cos(pt+90°)$ instead of $V \cos pt$. This phase-shifted voltage is then applied to the input of a mixer; the resultant D.-C. component of the mixer output current will have the same constant value as it had in the case of the conductance component measurement. If the smaller voltage drop across the series resistance, or a sample thereof, is now also applied to the mixer input, the D.-C. component of the mixer output current will again change, the change now being equal to $kI \sin \theta$. This, it will be seen from Eq. (1), is proportional to the susceptance being measured. By using the same calibration as before, the recording device which indicates the change in the mixer D.-C. output current component will now provide a direct reading of the value of the desired susceptance. Alternatively the recorder can be calibrated by substituting an admittance of known susceptance for the network being measured.

If the frequency of the constant amplitude voltage source is varied continuously over some desired band of frequencies, the recording device will provide a continuous indication of the value of the conductance or the susceptance as a function of frequency. If two mixers are employed simultaneously, in the manner described above, continuous indications of the values of both conductance and susceptance as functions of the frequency will be available. Measurements of the values of each of the components can then be separately displayed as continuous functions of the frequency. Alternatively, if desired, a recording device can be arranged to provide a graph of the "circle diagram" variety, in which the susceptance is plotted vertically and the corresponding value of conductance is plotted horizontally.

The essential method of the present invention for utilizing the above-described properties of mixers in the measurement of impedance, instead of admittance, is the following: An A.-C. current source of constant amplitude and variable frequency is connected to the driving-point terminals of a network. A resistance $r$ is connected in series with the source and the driving-point terminals. The voltage across this resistance, $rI \cos pt$, is in phase with and proportional to the applied current. If it is desired to measure the resistance and reactance components of the driving-point impedance, a second and smaller voltage is derived from the driving-point terminals. If, on the other hand, it is desired to measure the components of a transfer impedance, the second voltage is derived from the accessible open-circuit terminals of the appropriate mesh circuit. The terminal voltage in either case is representable by the expression $V \cos(pt+\phi)$. The constant amplitude voltage across the series resistance, or a sample thereof, is applied to the input of a mixer; the resultant D.-C. component of the mixer output current will have some constant value.

If the smaller voltage derived from the appropriate circuit terminals, or a sample thereof, is now also applied to the mixer input, the D.-C. component of the mixer output current will change, the change being equal to $kV \cos \phi$ which, it will be seen from Eq. (2), is proportional to the resistance being measured. As described previously, the recording device which indicates the change in the mixer D.-C. output current component can be calibrated directly in units of impedance, resistance, and reactance merely by substituting an impedance of known value for the network being measured.

To determine the reactance component of the impedance, the relative phase difference between the two A.-C. voltages is shifted by 90 degrees before they are applied to the mixer input. For example, the voltage across the resistance, or a sample thereof, is put through a 90 degree phase-shifter so that it is representable by the expression $rI \cos(pt+90°)$ instead of $rI \cos pt$. This phase-shifted voltage is then applied to the input of a mixer; the resultant D.-C. component of the mixer output current will have the same constant value as it had in the case of the resistance component measurement. If the smaller voltage derived from the appropriate circuit terminals, or a sample thereof, is now also applied to the mixer input, the D.-C. component of the mixer output current will again change, the change now being equal to $kV \sin \phi$. This, as will be seen from Eq. (2), is proportional to the reactance being measured. After calibration, the recording device which indicates the change in the mixer D.-C. output current component provides a direct reading of the value of the desired reactance component.

If the frequency of the constant amplitude current source is varied continuously over a particular frequency band of interest, the recording device will provide a continuous measurement of the value of resistance or reactance with frequency. Again, if two mixers are employed simultaneously as described above, continuous measurements of the values of both resistance and reactance with frequency can be provided. Measurements of each of these impedance components can then be separately displayed as continuous functions of the frequency. Alternatively, if desired, a recording device can be arranged to provide a graph of the "circle diagram" type, in which the reactance is displayed along the vertical coordinate and the corresponding value of resistance is displayed along the horizontal coordinate.

Attention is now directed to Figure 1, which is a schematic arrangement for the determination of the conductance and susceptance components of a driving-point admittance, typical of the method and means of the present invention. Reference numeral 10 denotes a source of A.-C. voltage of constant amplitude, of the form $V \cos pt$. This source is connected in series with a resistance 14 to the driving-point terminals of a network 12, the admittance components of which are to be measured. The value of resistance 14 is very small compared to the reciprocal of the driving-point admittance. This insures that the voltage applied to network 12 is essentially that of source 10, and that the current $I \cos(pt+\theta)$ through the terminals of network 12 is negligibly affected by resistance 14.

Two mixers, 16 and 17, are provided so that the conductance and susceptance components of the driving-point admittance are determined simultaneously. The output current of mixer 16 passes through a recorder 18, and that of mixer 17 passes through recorder 19. The recorders contain filters for by-passing the A.-C. components of the mixer output currents, so that their readings are indicative only of the D.-C. components of the respective mixer output currents. A simple form of recorder, completely satisfactory for the purpose at hand, is a D.-C. current meter across the terminals of which is connected a capacitance. The reactance of this by-pass capacitance at the source frequency is very small compared with the meter impedance.

To the input of each mixer is applied two A.-C. voltages. One of these is the voltage drop across the current-sampling resistance 14; it is applied in common to the input of both mixers. The other, its amplitude large relative to the first, is derived from the source; it is applied directly to the input of mixer 16 and also, through a 90 degree phase-shifter 20, to the input of mixer 17. This phase-shifter can be any one of a number of types well known in the art. While phase-shifter 20 is indicated in this and succeeding embodiments, to avoid circumlocution, as shifting the phase of one of the voltages by 90 degrees, this is not an essential requirement. Basically what is required is that an additional phase shift of 90 degrees be introduced between the two voltages applied to the input of mixer 17. This can be accomplished by use of 90 degree phase-shifter 20 as shown in the figures, or by phase shifting each of the voltages in such a way that the difference in the two phase shifts is 90 degrees. The latter alternative may be preferable for design convenience.

If resistance 14 is temporarily short-circuited each mixer will have impressed upon it only the relatively large constant amplitude voltage, and recorders 18 and 19 consequently will indicate steady values. These steady readings are merely fiducial values; it is only the departures from these values, which take place when the short circuit across resistance 14 is removed, that are of significance in the measurements. To do away with the need for even the simple computation, and thus make the recorders direct-reading, these steady values are reduced to zero. This is done, while the short circuit across resistance 14 is in position, either mechanically by merely re-setting the instrument zero, or electrically by adjusting to the proper value a bucking current—provided by an auxiliary D.-C. supply—through the recorder. The recorders now indicate only changes in the D.-C. components of the mixer output currents. These changes are proportional to the values of the driving-point admittance components at the source frequency. The recorder readings can be calibrated directly in units of admittance by substituting an admittance of known value, for example a simple parallel combination of known conductance and known susceptance, for network 12. When this has been done, the indications of recorder 18 represent directly the measured values of conductance, and those of recorder 19 represent directly the measured values of susceptance.

If the apparatus is used for measurement of the components of a driving-point admittance, as shown in Figure 1, recorder 18 will exhibit only positive readings, and recorder 19 will show positive or negative readings. On the other hand, if the apparatus is to be used for measurement of transfer admittance as well, the two recorders must be arranged to have their zero indications at the centers of their scales so that both positive and negative readings can be displayed.

While the type of embodiment depicted in Figure 1 is preferred because it provides a simultaneous record of both real and imaginary components, should it be desired to minimize the number of parts required, the embodiment in Figure 2 can be used. Only one mixer and recorder is employed in this embodiment. Phase-shifter 20 is selectively connected in or out, as desired, by the selective positioning of a two-way switch 22. When it is connected in, recorder 18 indicates the value of the susceptance component of the driving-point admittance of network 12. When it is removed by the alternate positioning of switch 22, recorder 18 indicates the value of the conductance component of the driving-point admittance of network 12. In this embodiment the 90 degree phase-shifter is preferably arranged, by including any necessary amplification as part of block 20, to have the amplitude of its output voltage the same constant value as that of the voltage derived from the source and applied alternately to the input of mixer 16. This insures that the fiducial steady reading of recorder 18 is the same for both positions of two-way switch 22, and obviates separate re-zero settings of the recorder for the two switch positions; it also permits a single calibration, in terms of an admittance of known conductance, to hold for both positions of the switch.

While the broad idea of the invention visualizes the use of any well-known type of mixer, an embodiment employing a multigrid vacuum tube will be specifically described in detail as a typical example. See Figure 3, which is a schematic diagram of an embodiment of the invention for the simultaneous measurement of the resistance and reactance components of a driving-point impedance.

In this figure, reference numeral 10 denotes a sinusoidal source of constant amplitude voltage, of the form $V \cos pt$. This source is connected in series with a resistance 14 to the driving-point terminals of a network 12, the impedance components of which are to be measured. The value of current-sampling resistance 14 is very large compared with the driving-point impedance; this insures that the current from the source is essentially constant and that the measured impedance is essentially the driving-point impedance.

Two mixers, of the type commonly known as Pentagrid Converters, and designated here by the numerals 16 and 17, are provided so that the resistance and reactance components of the driving-point impedance are determined simultaneously. The anode of mixer 16 is connected through D.-C. recorder 18 to a source of positive D.-C. polarizing voltage, and the anode of mixer 17 is connected through D.-C. recorder 19 to a similar positive D.-C. polarizing voltage. The anode of each mixer is also shunted by a by-pass capacitance of suitably low reactance.

The fifth grid and internal shield of each mixer are connected to the ground return. The second and fourth grids of such mixers are usually connected together internally; they are supplied with a suitable positive D.-C. polarizing voltage through a series dropping resistance shunted by an appropriate by-pass capacitance. The third grid 24 of each mixer is supplied with a suitable negative D.-C. polarizing voltage; in addition there is applied in common to these grids an A.-C. voltage of the form $V \cos (pt+\phi)$ derived across the driving-point impedance and amplified, if desirable, by a linear amplifier 23.

The first grid 25 of mixer 16 and the first grid 26 of mixer 17 are each biased with suitable negative D.-C. polarizing voltages; these can be provided by fixed D.-C. sources or, as shown in Figure 3, by using conventional grid-leak and capacitance means. In addition, grid 25 of mixer 16 has impressed upon it the relatively large constant amplitude A.-C. voltage $V \cos pt$ derived across the source and amplified, if desirable, by a linear amplifier 21. First grid 26 of mixer 17 also has impressed upon it the relatively large constant amplitude A.-C. voltage $V \cos (pt+90°)$ derived across the source, also amplified if desirable, and phase-shifted 90 degrees by means of phase-shifter 20.

The use of amplifiers 23, 21 and that understood to be included in 90 degree phase-shifter 20 may be advantageous for design reasons. By utilizing such amplification it is possible to adjust the A.-C. voltages applied to the mixer inputs at convenient levels, independently of the source 10. It is also possible to include within an amplifier such as 23 means for compensating any undesirable phase shift which is unavoidably introduced in sampling resistance 14 by, for example, stray capacitance. However, if such amplifiers are used, it is essential that the phase shifts introduced by the amplifiers be matched, so that the phase difference between the voltages applied to grids 24 and 25 is the same as that between the voltage across and current through the impedance or admittance being measured.

For proper mixer operation the D.-C. polarizing voltages are adjusted so that (a) with no A.-C. voltage applied to third grid 24, the steady anode current is negligibly affected by small variations in the amplitude of the relatively large A.-C. voltage applied to first grid 25 or 26; and (b) with a relatively small A.-C. voltage applied simultaneously to third grid 24, the change in anode current is as large as possible and proportional to the amplitude of the small A.-C. voltage.

The apparatus is now made direct-reading by a procedure similar to that described in connection with Figure 1. The A.-C. voltage connection to third grid 24 of mixers 16 and 17 is removed, and the resultant steady readings of recorders 18 and 19 are reduced to zero either mechanically by adjustment of the zero setting, or electrically by adjustment of a suitable bucking current. The A.-C. voltage connection to third grid 24 of the two mixers is reapplied, and a known impedance is substituted for network 12; this provides a calibration for the indications of recorder 18, which then measures resistance directly, and for the indications of recorder 19, which then measures reactance directly.

Figures 1, 2 and 3 illustrate diagrammatic embodiments for measuring of the components of a driving-point admittance or impedance. The corresponding measurement of the real and imaginary components of a transfer-admittance or impedance by the method and means of the present invention is straightforward, and will be described next.

Figure 4 indicates schematically the essential alterations required for measurement of the conductance and susceptance components of a transfer-admittance. Constant amplitude A.-C. voltage source 10 is connected directly to the driving-point terminals 43 of network 42, the transfer-admittance components of which are to be measured. A small resistance 14 is connected in series with the circuit mesh whose transfer current is to be sampled; the terminals 44 of network 42 to which current-sampling resistance 14 are connected will be referred to as the transfer terminals.

The voltage drop $RI \cos (pt+\theta)$ across the transfer terminals, or an amplified sample thereof, is applied as one of two A.-C. voltages to the input of a mixer, or in common to the inputs of two mixers if it is desired to obtain simultaneous measurements of both components of the transfer-admittance. The voltage $V \cos pt$ across the driving-point terminals 43, or an amplified sample thereof, is applied as the other relatively large and constant amplitude A.-C. voltage to the input of a mixer; the change in D.-C. output current of this mixer is proportional to the transfer-conductance. This voltage is also phase-shifted by 90 degrees and applied either alternately by means of a two-way switch to the input of the same mixer, or directly to the input of a second mixer. In either case the change in the D.-C. output of the mixer will be proportional to the transfer-susceptance. It will now be apparent that, aside from the few essential alterations shown in Figure 4, measurement of a transfer-admittance by the methods and means of the present invention is fundamentally the same as measurement of a driving-point admittance, described in detail in connection with Figures 1 and 2.

The corresponding measurement of the real and imaginary components of a transfer-impedance is likewise basically the same as measurement of the components of a driving-point impedance. Figure 5 indicates schematically the essential modifications required for measurement of the resistance and reactance components of a transfer-impedance. Constant amplitude A.-C. voltage source 10 is connected in series with resistance 14 to the driving-point terminals 43 of network 42, the transfer-impedance components of which are to be measured. The value $r$ of current-sampling resistance 14 is very large compared with the driving-point impedance; this insures that the current from the source is essentially constant.

The open-circuit voltage across the transfer terminals 44, or an amplified sample thereof, is applied as one of two A.-C. voltages to the input of a mixer, or in common to the input of two mixers if it is desired to obtain simultaneous measurements of both components of the transfer-impedance. The voltage across the terminals of source 10, or an amplified sample thereof, is applied as the other relatively large and constant amplitude A.-C. voltage to the input of a mixer; the change in D.-C. output current of this mixer is proportional to the transfer-resistance. This voltage is also phase-shifted by 90 degrees and applied either alternately by means of a two-way switch to the input of the same mixer, or directly to the input of a second mixer. In either case the change in the D.-C. output of the mixer will be proportional to the transfer-reactance. It will now be apparent that measurement of the components of a transfer-impedance by the methods and means of the present invention is basically the same as measurement of the components of a driving-point impedance, described in detail in connection with Figure 3.

If it is desired to measure the real and imaginary components of an impedance or an admittance at discrete frequencies, the frequency of source 10 in Figures 1 through 5 must be manually adjustable to the desired values. For measurements at such discrete frequencies, recorders of the direct-current meter variety, shown in Figure 3, are entirely satisfactory. However, it is often desired to present simultaneous measurements of the two components of an impedance or an admittance rapidly and over a wide and continuous range of frequencies. For such presentations it is necessary to provide means for continuously varying the frequency of source 10 over a definite range, and to do so cyclically. Furthermore, it is necessary that the recorders be suitable; for such purposes the D.-C. meter form of recorder is replaced by a cathode-ray type of indicator, or by a suitable pen-and-ink recorder.

Figure 6 shows schematically a typical arrangement of the invention adapted for use in presenting the relation between real and imaginary components of a driving-point impedance over a wide and continuous range of frequencies. The type of presentation employed here is referred to as a "polar" plot or as a "circle diagram" plot of an impedance or an admittance. This form of visually-continuous display is made up of a continuous succession of points or elements, each of which is comprised of the value of an imaginary component and the value of a real component, measured simultaneously at a given frequency and plotted orthogonally to each other. The imaginary component scale is along the vertical axis and the real component scale is along the horizontal axis; the frequency, which is not usually displayed explicitly, ranges monotonically from one end of the plotted curve to the other. In this type of presentation, the length of the straight line from the origin of coordinates to a given point on the displayed curve represents the absolute value of the measured impedance or admittance; and the angle between the straight line and the horizontal axis represents the corresponding phase of the impedance or admittance. If it is desired, frequency markers can be provided on this type of presentation, for example by using cathode-ray beam intensification to produce bright dots at pre-arranged frequency intervals along the curve.

The basic elements of Figure 6 are similar to those of Figure 3 except for modifications necessitated by the requirements for a visually-continuous display of the impedance components over a wide and continuous range of frequencies. The frequency of constant amplitude A.-C. voltage source 10 is varied monotonically at a relatively low rate through a chosen range by means of frequency sweep means 27. The latter may take the form of a motor-driven variable capacitor which comprises an integral part of the frequency-determining element of source 10; the pattern of variation of frequency with time, provided by this means, is repeated cyclically. The resistance and reactance components of the driving-point impedance of network 12 are measured simultaneously, as described in connection with Figure 3, by changes in the D.-C. components of the output currents of mixers 16 and 17, respectively. Here, however, since the source frequency is varied continuously at a relatively slow rate, the indicated D.-C. changes are not steady but also vary at a relatively slow rate.

These pulsating changes are amplified by low-pass amplifiers 31 which are also arranged to by-pass all A.-C. components in the mixer output currents which are characterized by the source frequency and its harmonics. The output voltages of low-pass amplifiers 31 are fed to the deflection plates of cathode-ray oscilloscope recorder 29. The amplified D.-C. changes in the output current of mixer 16, representing the measured resistance component, deflect the cathode-ray beam horizontally, while the amplified D.-C. changes in the output current of mixer 17, representing the simultaneously measured reactance component, deflect the cathode-ray beam vertically. As a result of these combined deflections the beam traces out a curve which is a polar plot of the continuous variation of driving-point impedance over the chosen frequency range. The incomplete circle shown on the face of recorder 29 in Figure 6 is a plot of this kind; it represents the variation, over a continuous range of frequencies, of the driving-point impedance of a resonant circuit comprised of the parallel elements inductance, capacitance, and resistance.

In this and similar embodiments of the invention for the automatic measurement of the two components of an impedance or an admittance over a wide and continuous range of frequencies, it is essential to observe certain requirements. These relate to the necessity for maintaining a constant amplitude output from amplifier 21 and phase-shifter 20, which provide the relatively large A.-C. voltages to the inputs of mixers 16 and 17; and to the necessity for matching the phase shifts and the relative gains introduced by the amplifiers over the range of frequencies employed.

Figure 7 shows schematically a typical embodiment of the invention adapted for use in simultaneously presenting against frequency the measured values of each of the two components of a driving-point admittance. This type of presentation is useful when the source frequency is varied over a wide and continuous range, as it brings out details which are not readily apparent in the customary form of polar plot, in which a frequency scale is not provided. The essential elements of Figure 7 are similar to those of Figures 1 and 2 except for modifications necessitated by the requirements for a visually-continuous display of the admittance components over a wide and continuous range of frequencies.

As shown in the figure, the conductance and susceptance components of the driving-point admittance of network 12 are measured simultaneously. If desired, however, these components can be measured separately by using a motor-driven or manually operated two-way switch which is arranged to connect a 90 degree phase-shifter alternately in or out, as described in connection with Figure 2. The frequency of constant amplitude A.-C. voltage source 10 is varied by frequency sweep means 27 as described in greater detail in connection with Figure 6. The conductance and susceptance components are measured simultaneously, as described in connection with Figure 1, by changes in the D.-C. components of the output currents of mixers 16 and 17, respectively.

Since the source frequency is being varied continuously at a slow rate the indicated D.-C. changes also vary at a slow rate. These slowly-varying changes are amplified by low-pass amplifiers 31. The amplified output of mixer 16 is applied to the vertical deflection plates of cathode-ray oscilloscope 18, which is used to display the measured values of conductance over the frequency range covered by the source. Similarly, the amplified output of mixer 17 is applied to the vertical deflection plates of cathode-ray oscilloscope 19, which is used to display the measured values of susceptance over the frequency range covered by the source. Voltage for the horizontal deflection plates of recorders 18 and 19 is supplied by horizontal deflection means 28, the input voltage of which is derived from source 10.

Horizontal deflection means 28 consists essentially of a suitable network and rectifier combination which is arranged to transform a constant amplitude A.-C. voltage of slowly varying frequency into a pulsating D.-C. voltage whose amplitude varies with the input frequency according to a desired law, for example linearly or logarithmically. By this means a common frequency scale of desired form is provided along the horizontal axes of cathode-ray oscilloscopes 18 and 19. In the type of presentation employed here, a point on the curve traced out by the cathode-ray beam of oscilloscope 18, for example, represents a particular value of the conductance component of the driving-point admittance measured at some frequency within the continuous range covered by the source. The curves actually shown on the faces of oscilloscopes 18 and 19 in Figure 7 are plots of this type; they represent the variation of driving-point conductance and susceptance, respectively, of an overcoupled two-mesh circuit in the reigon of the two shunt and single series resonance frequencies.

In the embodiments of the invention which have so far been described, the processes of amplification, phase-shifting and resolution of a sinusoidal voltage $$V \cos(pt+\phi)$$

into its component amplitudes by a novel arrangement and use of mixers have all been carried out at the frequency of the voltage supplied by source 10. For some purposes it is advantageous to perform these processes at a fixed and arbitrarily chosen frequency. This can be done by employing the heterodyne arrangement of Figure 8, which shows schematically an alternative embodiment of the invention adapted for use in presenting the relation between real and imaginary components of a driving-point admittance over a wide and continuous range of frequencies.

The frequency of constant amplitude A.-C. voltage source 10 is varied at a relatively slow rate over the desired range by frequency sweep means 27. Simultaneously the frequency of constant amplitude A.-C. voltage source 11 is varied by the same frequency sweep means. The frequencies of sources 10 and 11 are maintained at a constant difference which will be termed the intermediate frequency, abbreviated as i-f. The output of source 10 is applied in series with current-sampling resistance 14 to the driving-point terminals of network 12, the admittance components of which are to be measured and displayed in the form of a polar plot. The voltage derived across resistance 14, which is proportional to the current through the terminals of network 12, is applied to the input of mixer 56 together with the larger constant amplitude A.-C. voltage from source 11, which serves as a local oscillator for mixers 56 and 57. The i-f output current component of mixer 56 is proportional to the amplitude of the voltage across current-sampling resistance 14, and its frequency is equal to the constant frequency difference between sources 10 and 11.

This i-f mixer output component is amplified by i-f amplifier 53 and supplied as a relatively small A.-C. voltage in common to the inputs of mixers 16 and 17. The constant amplitude A.-C. voltage derived across source 10 is applied to the input of mixer 57, together with the larger constant amplitude A.-C. voltage from source 11. The i-f output current component of mixer 57 is proportional to the amplitude of the voltage derived across source 10, and its frequency is also equal to the constant frequency difference between sources 10 and 11. It is fed to the inputs of two separate channels: one of these is i-f amplifier 51, the other is i-f amplifier and 90 degree phase-shifter 50.

The output of i-f amplifier 51 is supplied as the relatively large constant amplitude A.-C. voltage to the input of mixer 16. The output of i-f amplifier and 90 degree phase-shifter 50 is supplied as the relatively large constant amplitude A.-C. voltage to the input of mixer 17. Since a common local oscillator 11 is employed to heterodyne the two sampled voltages, the phase shift between voltage across and current through the admittance being measured is maintained even though the frequency of these voltages is translated to an arbitrary fixed frequency at which amplification, phase-shifting, and resolution into component amplitudes are subsequently carried out.

Mixers 16 and 17, followed by low-pass amplifiers 31, provide the desired measured values of driving-point conductance and susceptance for the horizontal and vertical deflection plates, respectively, of cathode-ray oscilloscope 29 as described in detail previously. The polar plot actually shown on the face of oscilloscope 29 in Figure 8 represents the variation, over a continuous range of frequencies, of the driving-point admittance of a series resonant circuit of inductance, capacitance and resistance.

The methods and means of the present invention are well-suited not only to measurements of an impedance or an admittance at low and medium frequencies, but to microwave frequencies as well. In Figure 9 is shown schematically the essential modifications required for measurement of the driving-point admittance of a network supplied with power from a microwave frequency source by means, for example, of a coaxial transmission line.

The electric field intensity, which corresponds to the specific voltage, is sampled by probe 63, inserted into the coaxial transmission system immediately in front of network 62. The magnetic field intensity, which corresponds to the specific current, is sampled by loop 64, also inserted into the coaxial transmission system immediately in front of network 62.

The sampling voltages induced in probe 63 and loop 64 are proportional, respectively, to the voltage across and current through the driving-point terminals of network 62. Consequently they can be processed, for example in the same manner described in connection with Figure 8, to provide measurements of the driving-point conductance and susceptance of network 62.

While a few specific embodiments of the invention have been described in detail, it is understood that the scope of this invention is not limited to the specific embodiments described, but should be limited only by the scope of the appended claims.

The invention described herein may be manufactured and used by or for the Government of the United States of America for governmental purposes without the payment of any royalties thereon or therefor.

What is claimed is:

1. An impedance and admittance measuring apparatus comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, non-linear heterodyne mixing means coupled to said first and second means operative to mix the voltage samples obtained therefrom, thereby producing a D.-C. output of said mixing means linearly related to the real component of the impedance or admittance of said network, means for changing the relative phase of said first and second voltage samples by 90 degrees coupled to said first and second means, which latter phase-changed voltage samples are capable of being mixed in non-linear heterodyne mixing means to produce a D.-C. output linearly related to the imaginary component of the impedance or admittance of said network.

2. An impedance and admittance measuring apparatus comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, non-linear heterodyne mixing means coupled to said first and second means operative to mix the voltage samples obtained therefrom, thereby producing a D.-C. output of said mixing means linearly related to the real component of the impedance or admittance of said network, means for changing the relative phase of said first and second voltage samples by 90 degrees coupled to said first and second means, which latter phase-changed voltage samples are capable of being mixed in non-linear heterodyne mixing means to produce a D.-C. output linearly related to the imaginary component of the impedance or admittance of said network, and indicating means adapted to be coupled to said mixing means to indicate the incremental D.-C. output of said mixing means.

3. In an impedance and admittance measuring apparatus comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, non-linear heterodyne mixing means coupled to said first and second means operative to mix the voltage samples obtained therefrom, and thereby produce a change of D.-C. output linearly related to the real component of the impedance or admittance of the network under test, and indicating means adapted to be coupled to said mixing means to indicate the incremental D.-C. output of said mixing means.

4. In an impedance and admittance measuring apparatus comprising a source of alternating current energy directly coupled to the network to be tested, first means directly coupled to said source of alternating current for deriving a first relatively large amplitude voltage sample having a phase and magnitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, means for changing the relative phase of the first and second voltage samples by 90 degrees, non-linear heterodyne mixing means coupled to said first and second means operative to mix the voltage samples obtained therefrom, and thereby produce a D.-C. output linearly related to the imaginary component of the impedance or admittance of the network under test, and indicating means adapted to be coupled to said mixing means to indicate the incremental D.-C. output of said mixing means.

5. An impedance and admittance measuring apparatus comprising a sinusoidal source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and magnitude are dependent upon the sense and magnitude of the real and imaginary components of the impedance or admittance of the network under test, non-linear heterodyne mixing means coupled to said first and second means operative to mix the voltage samples obtained therefrom, thereby producing a D.-C. output of said mixing means linearly related to the real component of the impedance or admittance of said network, means for changing the relative phase of said first and second voltage samples by 90 degrees coupled to said first and second means, which latter phase-changed voltage samples are capable of being mixed in non-linear heterodyne mixing means to produce a D.-C. output linearly related to the imaginary component of the impedance or admittance of said network, and indicating means adapted to be coupled to said mixing means to indicate the incremental D.-C. output of said mixing means.

6. An impedance and admittance measuring apparatus comprising a source of alternating current energy continuously sweeping over a frequency range directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and magnitude are dependent upon the sense and magnitude of the real and imaginary components of the impedance or admittance of the network under test, non-linear heterodyne mixing means coupled to said first and second means operative to mix the voltage samples obtained therefrom, thereby producing a varying D.-C. output of said mixing means linearly related to the real component of the impedance or admittance of said network, means for changing the relative phase of said first and second voltage samples by 90 degrees coupled to said first and second means, which latter phase-changed voltage samples are capable of being mixed in non-linear heterodyne mixing means to produce a D.-C. output linearly related to the imaginary component of the impedance or admittance of said network, and indicating means adapted to be coupled to said mixing means to indicate the varying incremental D.-C. outputs of said mixing means.

7. An impedance and admittance measuring apparatus comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, the two voltage samples being of the same frequency but the amplitude of the second being small relative to that of the first, non-linear heterodyne mixing means coupled to said first and second means operative to mix the voltage samples obtained therefrom in such a way that the D.-C. output of said mixing means is linearly related to the amplitude of the second voltage sample only, thereby producing a D.-C. output of said mixing means linearly related to the real component of the impedance or admittance of said network, means for changing the relative phase of said first and second voltage samples by 90 degrees coupled to said first and second means, which latter phase-changed voltage samples are capable of being mixed in non-linear heterodyne mixing means to produce a D.-C. output linearly related to the amplitude of the second voltage sample only, thereby producing a D.-C. output linearly related to the imaginary component of the impedance or admittance of said network, and indicating means adapted to be coupled to said mixing means to indicate the incremental D.-C. output of said mixing means.

8. An impedance and admittance measuring apparatus comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the sense and magnitude of the real and imaginary components of the impedance or admittance of the network under test, frequency-changing means coupled to said first and second means operative to produce voltage samples proportional to said first and second voltage samples but at a predetermined intermediate frequency, non-linear heterodyne mixing means coupled to said frequency-changing means operative to mix the voltage samples obtained therefrom, thereby producing a D.-C. output of said mixing means linearly related to the real component of the impedance or admittance of said network, means for changing the relative phase of said frequency-changed voltage samples by 90 degrees coupled to said frequency-changing means, which latter phase-changed voltage samples are capable of being mixed in non-linear heterodyne mixing means to produce a D.-C. output linearly related to the imaginary component of the impedance or admittance of said network, and indicating means adapted to be coupled to said mixing means to indicate the incremental D.-C. output of said mixing means.

9. Apparatus for measuring transfer admittance or impedance comprising a source of alternating current energy directly coupled to the network to be tested, first means directly coupled to said source of alternating current for deriving a first relatively large amplitude voltage sample having a phase and amplitude that are unaffected by said network, second means coupled to the circuit including said source and said impedance for deriving a relatively small amplitude second voltage sample whose phase and amplitude are dependent upon the real and imaginary components of the transfer impedance or admittance of the network under test, first means being coupled to the driving point terminals of said network, and the second means being coupled to the transfer terminals of said network, non-linear heterodyne mixing means coupled to said first and second means operative to mix the voltage samples obtained therefrom, thereby producing a D.-C. output of said mixing means linearly related to the real component of the transfer impedance or admittance of said network, means for changing the relative phase of said voltage samples by 90 degrees coupled to said first and second means, which latter phase-changed voltage samples are capable of being mixed in non-linear heterodyne mixing means to produce a D.-C. output linearly related to the imaginary component of the transfer impedance or admittance of said network, and indicating means adapted to be coupled to said mixing means to indicate the incremental D.-C. output of said mixing means.

10. Apparatus for displaying measurements of the imaginary versus the real components of admittance or impedance of a network, comprising a source of alternating current energy adapted to be directly coupled to said network, a cathode ray indicator having two pairs of plates in quadrature relation, frequency sweep means coupled to said source and designed periodically to vary the frequency of the energy supplied by said source over a continuous range, means directly coupled to said source of alternating current for deriving a relatively large amplitude voltage sample unaffected by said network, means coupled to the circuit including said source and said impedance for deriving a relatively small amplitude second voltage sample whose phase and amplitude are dependent upon the sense and magnitude of the real and imaginary components of impedance or admittance of said network, the amplitude of the second derived voltage being small relative to the other, a first non-linear heterodyne mixing circuit for mixing the aforementioned voltage samples, a phase changer coupled to at least one of the two voltage sample-deriving means operative to change the relative phase of the two voltage samples by 90 degrees and a second non-linear heterodyne mixing means for mixing the two relatively, phase shifted voltage samples, the incremental D.-C. output voltage variation from said first mixing means being applied to one pair of plates, the incremental D.-C. output voltage variation from said second mixing means being applied to the other of said two pairs of plates, thereby providing an indication of imaginary versus real components over the swept frequency range.

References Cited in the file of this patent

UNITED STATES PATENTS

| | | |
|---|---|---|
| 2,557,798 | Reitz, Jr. | June 19, 1951 |
| 2,592,750 | Selove | Apr. 15, 1952 |
| 2,595,675 | Jaynes | May 6, 1952 |
| 2,605,323 | Samuel | July 29, 1952 |